United States Patent [19]
Vincent

[11] 3,721,068
[45] March 20, 1973

[54] GAS STREAM SCRUBBER

[76] Inventor: Dan B. Vincent, P.O. Box 5478, Tampa, Fla. 33605

[22] Filed: Feb. 1, 1972

[21] Appl. No.: 222,628

[52] U.S. Cl. .................. 55/223, 55/228, 55/229, 55/244, 55/256, 261/119
[51] Int. Cl. .................................................. B01f 3/04
[58] Field of Search ........ 55/256, 244, 255, 246, 249, 55/245, 228, 229, 223, 95, 239; 261/119

[56] References Cited

UNITED STATES PATENTS

| 628,639 | 7/1899 | Steele | 55/256 |
|---|---|---|---|
| 2,406,278 | 8/1946 | Worth | 55/239 |
| 3,321,191 | 5/1967 | Najarian | 55/256 |
| 3,527,026 | 9/1970 | Miura | 55/239 |

FOREIGN PATENTS OR APPLICATIONS

| 890,867 | 11/1943 | France | 55/255 |
|---|---|---|---|

*Primary Examiner*—Tim R. Miles
*Attorney*—John W. Malley et al.

[57] ABSTRACT

There is disclosed a countercurrent system, for instance for removing particles, such as fish solids, citrus pulp and other dust particles or syrupy droplets, from the exhaust gases from a dryer or the like. The system includes a vessel provided with coaxially interdigitated upper and lower baffles which control a countercurrent flow of the washing liquid and gas stream. The baffles are of graduating heights and the upper set "floats" at a level determined by the pressure within the vessel. The washing liquid with entrained gas assists in cleansing the baffles. Cleaning ports may also be provided.

4 Claims, 2 Drawing Figures

GAS STREAM SCRUBBER

BACKGROUND OF THE INVENTION

A countercurrent scrubber is disclosed in my U.S. Pat. No. 3,618,299, issued Nov. 9, 1971 (based on application Ser. No. 812,467 filed Apr. 1, 1969). The scrubber disclosed in the present application may be used for much the same purposes, but is less expensive to manufacture, is self-cleaning to a greater extent, and is easier to clean and maintain. It is more responsive to changing conditions.

U.S. Pat. No. 2,818,135 to White relates to an air cleaner having concentric baffles over which the air flows as it is washed (see FIG. 2), although there is no liquid flow over the baffles.

The U.S. Pat. to Rothfeld et al., No. 3,397,514, relates to an air filter using an oil bath to wash the air as it travels over the baffles 5 and 13. The air must also pass through a filter 6 at the end of each baffle.

The U.S. Pat. Nos. to Moughler, 881,194, and Szekely, 1,267,606, disclose air cleaners which separate the dust from the air by passing the air over a baffle and contacting it with a liquid bath. The baffles are set up by means of concentric cylinders.

The following U.S. Pats. relate to various air cleaners which use a liquid bath and a series of baffles to contact the gas with the bath, although the baffles are not necessarily in concentric arrangement:

No. 283,025
No. 1,062,446;
No. 2,238,824;
No. 3,131,237.

The Ernst U.S. Pat. No. 1,062,446, shows water flowing between the baffles while contacting the gas.

The principles of the invention will be further hereinafter discussed with reference to the drawing wherein a preferred embodiment is shown. The specifics illustrated in the drawing are intended to exemplify, rather than limit, aspects of the invention as defined in the claims.

DETAILED DESCRIPTION OF THE PRESENTLY PREFERRED EMBODIMENT

Figure 1:
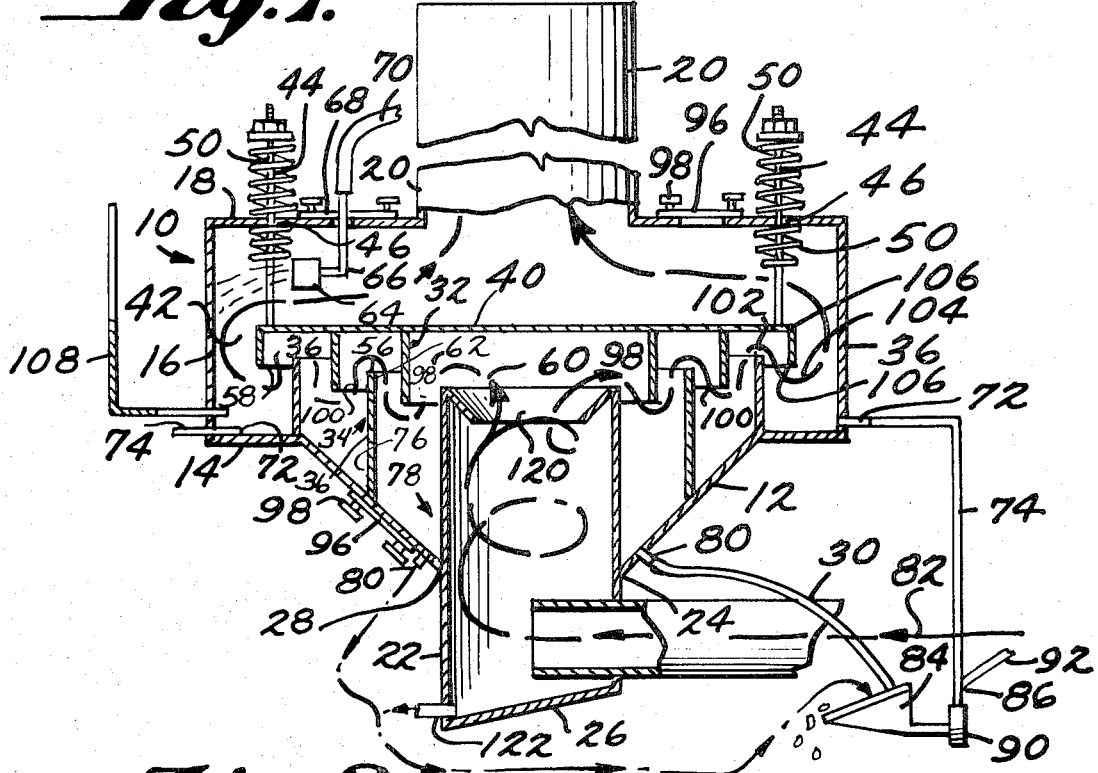
FIG. 1 is a longitudinal, vertical sectional view of a scrubber constructed in accordance with the principles of the present invention.
Figure 2:
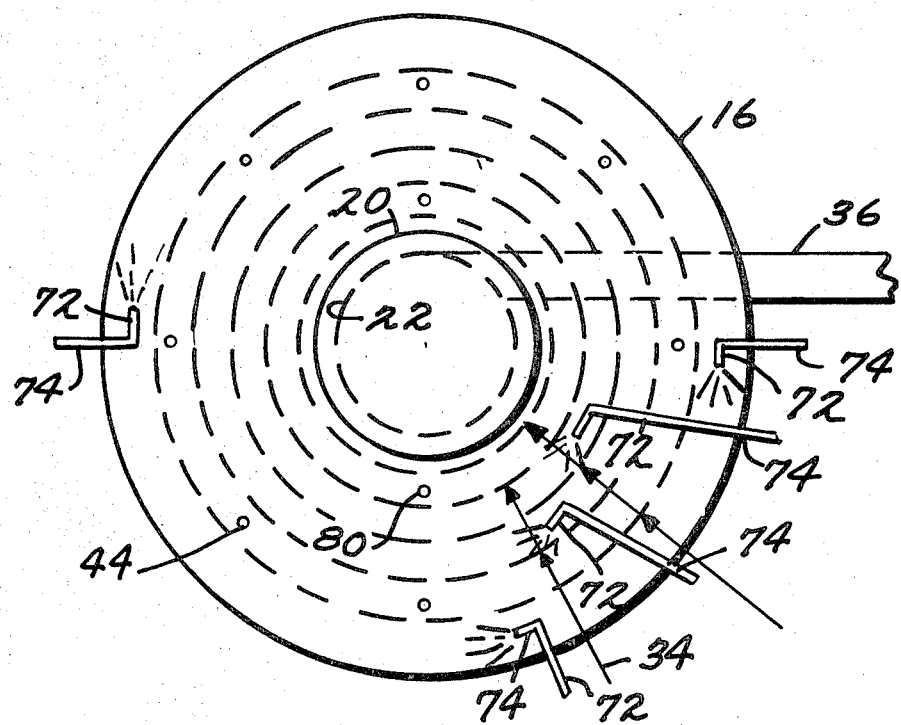
FIG. 2 is a top plan view thereof.

The scrubber 10 includes an intermediate, annular frusto-conical bottom wall portion 12 which "points" downwardly. At its outer periphery, the wall portion 12 merges with an outer, annular, radially extending (i.e., substantially flat, horizontal) bottom wall portion 14. The wall portion 14 at its radially outer periphery merges with the lower periphery of a tubular, cylindrical, vertical side wall 16. The latter at its upper periphery merges with the radially outer periphery of an outer, annular, radially extending (i.e., substantially flat, horizontal) top wall portion 18. At the radially inner peripheral extent thereof, the wall portion 18 merges with the lower periphery of a tubular, cylindrical gas stream outlet stack 20.

A tubular cylindrical gas stream inlet conduit 22 is fitted into the scrubber vessel through the central opening 24 of the bottom wall portion 12. The lower end of the conduit 22 lies below the opening 24 and is closed by an end wall 26. The upper end of the conduit 22 is shown lying above the wall portion 14. The inner periphery of the wall portion 12 is circumferentially secured at 28 to the exterior of the inlet conduit 22 intermediate the upper and lower ends of the latter.

A generally horizontal tangential conduit portion 30 feeds the conduit 22 below where the latter emerges from the opening 24.

Within the scrubber vessel there is provided an upper set of baffles 32 and a lower set of baffles 34. Each set is shown comprising three tubular cylindrical baffles 36, all baffles of both sets being coaxially located with respect to the vessel and with respect to one another.

The lower set of baffles 34 is shown including a first, radially outermost baffle disposed with its lower end secured on the bottom wall portion 14 adjacent the juncture of the bottom wall portions 12 and 14; a second, radially intermediate baffle disposed with its lower end secured on the bottom wall portion 12 intermediate the radial and vertical extent of the bottom wall portion; and a third, radially innermost baffle which is shown constituted by the upper end region of the gas stream inlet conduit 22.

The upper set of baffles 32 is shown suspended from securement on the underside of a flat, disk-shaped plate 40 which is horizontally disposed within the scrubber vessel. The plate 40 lies generally intermediate the flat, horizontal bottom wall portion 14 and the flat, horizontal top wall portion 18. The plate 40 is of greater diameter than the frusto-conical bottom wall portion 12, but of smaller diameter than the sidewall 16. Thus, there is defined an annular passageway 42 between the plate 40 and wall 16.

The plate 40 is suspended from the top wall portion 18 by a plurality of bolts 44 which extend upwardly through openings 46 in the top wall portion 18. Outside, nuts 48 adjustably threadably secured on the bolts 44 provide a lower limit for the disposition of the plate 40. Compression coil springs 50 received on the shanks of the bolts 44 between the upper side of the plate 40 and the underside of the top wall portion 18 resiliently provide an upper limit for the disposition of the plate 40.

The upper set of baffles 32 is shown including a first, radially outermost baffle disposed at the outer periphery of the plate 40, radially intermediate the sidewall 16 and the radially outermost baffle of the lower set of baffles; a second, radially intermediate baffle disposed radially intermediate the radially outermost and radially intermediate baffles of the lower set of baffles; and a third, radially innermost baffle disposed radially intermediate the radially intermediate and the radially innermost baffles of the lower set of baffles.

The upper edges 56 of the baffles of the lower set of baffles, if joined, would define a frusto-conical surface which decreases in height as it proceeds radially inwardly. The lower edges 58 of the baffles of the upper set of baffles, if joined, would define a frusto-conical surface which increases in height as it proceeds radially outwardly. These two imaginary frusto-conical surfaces would have approximately the same cone angle, of e.g., 30°.

Normally, each baffle of one set axially overlaps the radially adjacent baffle(s) of the other set to provide a tortuous gas stream path 60 leading through and from the open upper end 62 of the tubular cylindrical gas stream inlet conduit 22, over and under the respective edges 56, 58 of the baffles 34, 36 through the annulus 42, radially inwardly and upwardly over the upper side of the plate 40 and out the stack 20.

At the base of the stack 20 there are provided a plurality of nozzles 64 connected by piping 66 to a fitting 68 mounted in the wall of the vessel. The fitting 68 is designed to be connected to a flexible hose 70, e.g., of the garden variety, connected to a supply of clean water, for absorbing, entraining, dissolving or otherwise removing remaining entrained particles from the exiting gas stream. This design provides for easy access to the upper part of the vessel for cleaning, should that become necessary.

The vessel is also provided with a plurality of liquid inlets 72 aimed in a horizontal, tangential direction near the bottom wall portion. The inlets 72 are connected with piping 74 which enters through the vessel sidewall 16. In order to achieve the full benefits of countercurrent flow, the liquid introduced through the inlets 72 is preferably introduced exteriorly of the radially outermost lower baffle, but in order to assist in the prevention of sludge build-up in the acute angle trough 76 between the radially intermediate lower baffle and the frusto-conical bottom wall portion 12, some of the inlets 72 could be disposed in the trough 76. Alternatively, this region could be provided with clean-out ports. In fact, the trough 78 between the bottom wall portion 12 and the inlet conduit 22 is shown provided with a plurality of angularly spaced drains 80 for draining from the vessel the liquid introduced at 64, the liquid introduced at 72, and the dissolved and entrained solids, liquids and gases removed from the gas stream which enters at 22 and exits at 20.

The liquid which drains at 80 is forwarded through piping 82 to a solids separation station such as a bar screen 84 which recovers as tailings, undissolved solids down to a selected particle size. The stream passing through the screen may be split, e.g., at 86, and part recycled through piping 74 to the inlets 72. A pump 90 is shown provided for forwarding the liquid being recycled. The nonrecycled portion of the stream may be forwarded through the line 92 for concentration by evaporation of water and volatiles to recover a concentrated by-product which in many instances can be valuable.

As an example of size and utility, the scrubber 10 may function as a gas stream purifier for the 20,000 cfm exhaust of a fish meal dryer and syrup concentrator, wherein the gas stream contains fine droplets and particles of concentrated fish solubles and dust. In such an instance, the vessel sidewall 16 may e.g., be 12 feet in diameter and 9 feet high, excluding the stack 20. In that example, the inlet 22 is 4 feet in diameter and about 4 feet in length.

The vessel may be advantageously provided with a plurality of manholes and covers 96, removably sealed in place by means such as threaded studs and wing nuts 98.

In use, dirty inbound gas swirls tangentially about and axially up the inlet 22, and strikes the bottom of the plate 40 within the area bounded and partly confined by the radially innermost of the upper baffles. The gases are thus deflected down against the liquid at 98 between the radially innermost lower baffle and the radially innermost upper baffle. To a certain extent, the raise in pressure caused by this partial confinement of an incoming, flowing gas stream results in a lifting of the plate 40 against the restorative force of the compression coil springs 50. In order to escape (provided the pressure within the vessel is kept low enough that the plate 40 is not lifted excessively), the gases must pass beneath the liquid surface at 98, whereupon they pass under the radially innermost upper baffle and up into the head space between the radially innermost and radially intermediate upper baffles, above the radially intermediate lower baffle. To progress further, the gas stream must reenter the countercurrent flow of liquid at 100 in order to escape into the head space 102. Then the gas stream escapes radially outwardly from under the plate 40 by passing under the radially outermost upper baffle. This latter deflection causes at least some of the gas stream to reenter the liquid at 104 between the radially outermost lower baffle and the sidewall 16, before passing up through the annular space between the sidewall 16 and the radially outermost upper baffle. Then the gas stream passes over the top of the plate 40 and as it begins to rise in the stack 20, the clean water entering through the spray nozzles at the base of the stack rains remaining impurities therefrom. The raining liquid lands on the upperside of the plate 40, runs to the radially outer edge thereof and drips off at 106 to provide a circumferential curtain of liquid through which any of the gas stream which is not deflected into the liquid at 104 must pass on its way around the outside of the plate 40.

The control of gas and liquid streams may be controlled by standard sensing means, assisted, if necessary, by manual controlling based on observation of the interior of the vessel through means such as a sight glass 108. Normally, the liquid inflow at 72 is maintained at such a rate that there is considerable turbulence in the liquid within the vessel, and the liquid cascades over the radially outermost and radially intermediate of the lower baffles to reach the compartment between the radially innermost and radially intermediate lower baffles, from which compartment it drains at the bottom. The flow rate is kept down sufficiently to avoid overflowing the radially innermost lower baffle, since that would flood the gas stream inlet 22. Alternatively, an annular internal frusto-conical baffle 120 may be provided on the upper end of the inlet 22, extending downwardly and inwardly at e.g., 45°. Wash water may then be allowed to flow over the inlet upper end and be thrown centrally to produce an annular curtain through which the incoming gas stream must pass. Almost all of the large particles of entrained solids in the gas stream may be washed out at this stage. The overflowing wash water with entrained solids may drain from a trap 122 in the gas stream inlet.

The amount the plate 40 will rise during use of the scrubber will depend upon the weight thereof, the flow rate of the inbound gas stream, the force constants of the compression coil springs and their adjustment, among other factors. Adjustments of the springs are used to "fine tune" the apparatus once it has been fabricated and running, to determine the extent of the incursion of the gas stream into the liquid filled compartments to improve absorption when that is needed and to relieve back pressure when that is needed.

It should be apparent that the scrubber has broader utility in cleaning gas streams than use in conjunction with a fish meal processing system.

It should now be apparent that the gas stream scrubber as described hereinabove possesses each of the attributes set forth in the specification under the heading "Detailed Description of the Presently Preferred Embodiment" hereinbefore. Because the gas stream scrubber of the invention can be modified to some extent without departing from the principles of the invention as they have been outlined and explained in this specification, the present invention should be understood as encompassing all such modifications as are within the spirit and scope of the following claims.

What is claimed is:

1. A wet countercurrent gas stream scrubber comprising:

a closed vessel having a generally tubular cylindrical sidewall; said vessel having a bottom wall; said vessel having an upper end wall having conduit means defining an exhaust stack extending axially, centrally, upwardly therefrom;

means defining a gas stream inlet conduit entering said vessel axially, centrally, upwardly through the bottom wall and having an open upper end within said vessel; at least one inlet pipe merging with said gas stream inlet conduit below where said gas stream inlet conduit enters said vessel;

a plurality of generally tubular, upstanding cylindrical members mounted on said bottom wall coaxially surrounding said gas stream inlet conduit at differing radial distances therefrom; said members, together with said gas stream inlet conduit adjacent and leading to the open upper end thereof constituting a lower set of baffles;

a generally horizontal disk within said vessel above said lower set of baffles;

means mounting said disk within said vessel generally coaxially therewith, the radially outer extent of said disk being less than the inner diameter of said generally tubular cylindrical sidewall to define an annular passage around the disk from thereunder to thereover;

and means defining a plurality of generally tubular, depending cylindrical members having upper ends mounted on said disk, coaxially therewith at differing radial distances from the longitudinal axis of the vessel, said depending members constituting an upper set of baffles;

means defining at least one washing liquid inlet to said vessel between said side wall and the radially outermost baffles of said lower set of baffles; and means defining at least one drain from said vessel between the said bottom wall and said gas stream inlet conduit radially adjacent the latter;

the upper extents of the baffles of the lower set of baffles declining from baffle-to-baffle radially inwardly whereby circulating liquid may cascade radially inwardly from the inlet thereof to the outlet thereof over the baffles of the lower set of baffles;

the lower extents of the baffles of the upper set of baffles axially interpenetrating radially between radially adjacent ones of said lower set of baffles in order to deflect the gas stream being cleaned repeatedly into the cascading liquid.

2. The scrubber of claim 1 wherein the means mounting said disk comprise rod means extending upwardly from securements to said disk through means defining openings in the upper end wall of the vessel; securements mounted on said rods exteriorly of the upper end wall; and coil springs coaxially respectively mounted on the rods and having purchase against the upper end wall and the rods in a sense to resiliently urge the disk downwardly, whereby said disk may float upwardly against the urging of said springs, upon being buoyed from below by the gas stream entering the vessel through the open upper end of the gas stream inlet conduit.

3. The scrubber of claim 1 further including clean liquid spray means within said vessel at the base of said exhaust stack for contacting the gas stream with clean liquid as the gas stream is exiting from the vessel, the spray means, disk and stack being so arranged with respect to one another that the liquid issuing from the spray means, after contacting the exiting gas stream, drips to the disk, runs thereover and drips off the radially outer edge thereof.

4. The scrubber of claim 3 wherein said drain means is connected to a conduit having means defining a stream splitter; a first and a second conduit connected to said stream splitter for receiving a first stream and a second stream split from the first-mentioned conduit thereby; the first conduit forwarding said first stream to said washing liquid inlet and the second conduit withdrawing said second stream.

* * * * *